US008054779B2

(12) United States Patent
Hassan et al.

(10) Patent No.: US 8,054,779 B2
(45) Date of Patent: Nov. 8, 2011

(54) SIMULTANEOUS WIRELESS SUPPORT IN SOFTWARE DEFINED RADIO

(75) Inventors: Amer A. Hassan, Kirkland, WA (US); Deyun Wu, Issaquah, WA (US); Hui Shen, Sammamish, WA (US); Christian Huitema, Clyde Hill, WA (US); Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 11/899,276

(22) Filed: Sep. 5, 2007

(65) Prior Publication Data

US 2008/0279128 A1 Nov. 13, 2008

Related U.S. Application Data (60) Provisional application No. 60/928,168, filed on May 8, 2007.

(51) Int. Cl.
*H04W 4/00* (2009.01)
(52) U.S. Cl. ........ 370/328; 370/203; 370/310; 370/338; 370/347; 375/219; 375/220; 375/261; 375/316; 455/140; 455/432.2; 455/440; 455/561
(58) Field of Classification Search .................. 370/203, 370/310, 328, 338, 347; 375/219, 220, 261, 375/271, 316; 455/140, 432.2, 440, 552.1, 455/561
See application file for complete search history.

(56) References Cited

U.S. PATENT DOCUMENTS

| | | | | |
|---|---|---|---|---|
| 5,504,803 A | * | 4/1996 | Yamada et al. | 455/426.1 |
| 5,995,829 A | * | 11/1999 | Broderick | 455/418 |
| 6,122,514 A | * | 9/2000 | Spaur et al. | 455/448 |
| 6,219,539 B1 | * | 4/2001 | Basu et al. | 455/417 |
| 6,272,315 B1 | * | 8/2001 | Chang et al. | 455/13.1 |
| 6,353,846 B1 | * | 3/2002 | Fleeson | 718/104 |
| 6,828,400 B1 | * | 12/2004 | Newberth et al. | 526/321 |
| 6,915,142 B1 | * | 7/2005 | Wietfeldt | 455/557 |
| 6,954,446 B2 | * | 10/2005 | Kuffner | 370/335 |
| 6,968,195 B2 | * | 11/2005 | Nowak | 455/456.2 |

(Continued)

FOREIGN PATENT DOCUMENTS

WO  WO 2004/057505 A1  7/2004

OTHER PUBLICATIONS

Lin, V.S. et al. "Implementation of Reconfigurable Software Radio for Multiple Wireless Standards," *2004 IEEE Aerospace Conference Proceedings*, pp. 1392-1397.

(Continued)

*Primary Examiner* — Ayaz Sheikh
*Assistant Examiner* — Andrew C Lee
(74) *Attorney, Agent, or Firm* — Wolf, Greenfield & Sacks, P.C.

(57) ABSTRACT

A system and method for providing the ability to discover the capabilities of a user's computer to determine whether it is capable of supporting more than one wireless protocol simultaneously is provided. A computing device's capabilities (including, for example, hardware and/or software capabilities) is checked to determine if it supports at least two specific wireless protocols and checking a computing device's capabilities (including, for example, hardware and/or software capabilities) is checked to determine if it supports both wireless protocols simultaneously. The techniques for determining the computing device's compatibility may include comparing lists of protocol requirements to lists of system capabilities and/or generating test signals by the system according to the protocol.

17 Claims, 5 Drawing Sheets

U.S. PATENT DOCUMENTS

| | | | |
|---|---|---|---|
| 7,006,828 B1 * | 2/2006 | Czaja et al. | 455/442 |
| 7,043,023 B2 | 5/2006 | Watanabe et al. | |
| 7,092,716 B2 * | 8/2006 | Nizri et al. | 455/448 |
| 7,151,925 B2 | 12/2006 | Ting et al. | |
| 7,272,413 B2 * | 9/2007 | Yu | 455/552.1 |
| 7,283,838 B2 * | 10/2007 | Lu | 455/550.1 |
| 7,319,715 B1 * | 1/2008 | Souissi et al. | 375/220 |
| 7,346,342 B2 * | 3/2008 | Kirbas | 455/415 |
| 7,493,141 B2 * | 2/2009 | Brobston et al. | 455/552.1 |
| 7,525,970 B2 * | 4/2009 | Mangin et al. | 370/395.21 |
| 7,529,559 B2 * | 5/2009 | Yamanaka et al. | 455/550.1 |
| 7,539,175 B2 * | 5/2009 | White et al. | 370/350 |
| 7,551,988 B1 * | 6/2009 | Wichgers et al. | 701/3 |
| 7,571,205 B2 * | 8/2009 | Oz et al. | 709/201 |
| 7,675,852 B1 * | 3/2010 | Arundale et al. | 370/229 |
| 7,729,666 B2 * | 6/2010 | Zhang et al. | 455/88 |
| 7,761,075 B2 * | 7/2010 | Cleveland et al. | 455/296 |
| 7,899,017 B2 * | 3/2011 | Yu et al. | 370/338 |
| 2002/0116545 A1 * | 8/2002 | Mandato et al. | 709/328 |
| 2003/0050070 A1 * | 3/2003 | Mashinsky et al. | 455/452 |
| 2003/0074494 A1 * | 4/2003 | Rene Salle | 710/8 |
| 2004/0029575 A1 | 2/2004 | Mehta | |
| 2005/0041746 A1 * | 2/2005 | Rosen et al. | 375/242 |
| 2005/0055689 A1 | 3/2005 | Abfalter et al. | |
| 2005/0059427 A1 | 3/2005 | Wallace | |
| 2005/0108382 A1 * | 5/2005 | Murotake et al. | 709/223 |
| 2005/0141545 A1 * | 6/2005 | Fein et al. | 370/445 |
| 2005/0243952 A1 | 11/2005 | Li | |
| 2006/0034461 A1 * | 2/2006 | Park | 380/277 |
| 2006/0046716 A1 * | 3/2006 | Hofstaedter et al. | 455/432.2 |
| 2006/0130053 A1 | 6/2006 | Buljore et al. | |
| 2006/0154691 A1 | 7/2006 | Tang et al. | |
| 2006/0193295 A1 | 8/2006 | White et al. | |
| 2006/0282497 A1 | 12/2006 | Braun et al. | |
| 2006/0287001 A1 | 12/2006 | Budampati et al. | |
| 2007/0049344 A1 * | 3/2007 | Van Der Velde et al. | 455/560 |
| 2008/0112361 A1 * | 5/2008 | Wu | 370/330 |
| 2008/0242347 A1 * | 10/2008 | Zetterman et al. | 455/552.1 |
| 2009/0156215 A1 * | 6/2009 | Pitkamaki | 455/437 |
| 2009/0168701 A1 * | 7/2009 | White et al. | 370/328 |
| 2009/0186600 A1 * | 7/2009 | Hutcheson et al. | 455/408 |
| 2009/0323833 A1 * | 12/2009 | Karayil Thekkoott Narayanan | 375/259 |
| 2010/0278281 A1 * | 11/2010 | Hara et al. | 375/295 |

OTHER PUBLICATIONS

"Green Hills Platform for Software Defined Radio," *Green Hills Software Inc.*

"Software-Defined Radio, White Paper" *Wipro Technologies*, Aug. 2002 pp. 1-10.

* cited by examiner

Figure 4

# SIMULTANEOUS WIRELESS SUPPORT IN SOFTWARE DEFINED RADIO

CROSS REFERENCE TO RELATED APPLICATION

This application claims the benefit of U.S. Provisional Patent Application Ser. No. 60/928,168, filed May 8, 2007, which is hereby incorporated by reference in its entirety.

BACKGROUND

Wireless technology for computing systems is constantly changing and evolving. New wireless protocols are released each year directed to solving new problems or more efficiently solving old problems. As new technologies are released implementing new protocols, demand grows for computing devices that support more and more protocols.

Devices capable of communicating using one or more wireless technologies are referred to as radios. In early radio implementations, support for more protocols required more hardware to support those protocols since each protocol depended on specific hardware—e.g., amplifiers, antennas, filters, etc.—for support. More hardware in turn required more space and more power, and possibly even more hardware to deal with signal interference between components.

Efficiency considerations have led to the development of new radio implementations that move some functions from being performed in hardware to being performed in software. These new implementations are known as software defined radio (SDR). In some cases, multiple wireless communication protocols can be supported by one set of hardware. Software defined radio relies on technology progress to determine what access can be enabled by the current operating system and hardware configuration. The capability of current technology has to be discovered, and saved in a User-Interface (UI), such as Windows®, prior to downloading/uploading schema description of the Standard of interest. The disclosure addresses some issues arising in the use of SDR in multi-radio transmission. The multi-radio simultaneous transmission requires the software and hardware to be compatible, and proper design of the UI exposed to end users.

SUMMARY

Applicants have appreciated that as the reliance on SDR increases, numerous potential options may be available to a user for performing wireless communication. Applicants have appreciated the desirability of providing the ability to discover the capabilities of a user's computer to determine whether it is capable of supporting more than one wireless protocols simultaneously. In view of the foregoing, embodiments of the present invention are directed to a process for checking a computing device's capabilities (including, for example, hardware and/or software capabilities) to determine if it supports at least two specific wireless protocols and for checking a computing device's capabilities (including, for example, hardware and/or software capabilities) to determine if it supports both wireless protocols simultaneously. The techniques for determining the computing device's compatibility may include comparing lists of protocol requirements to lists of system capabilities and/or generating test signals by the system according to the protocol.

In one embodiment, a method of using an SDR-enabled wireless device is provided. The device has system parameters. The method includes initiating a request to allow simultaneous communication of multiple radios and considering system requirements for the simultaneous communication. The method also includes comparing the system requirements for the simultaneous communication to the system parameters; and enabling simultaneous communication of multiple radios when the system parameters are within the system requirements.

In another embodiment, a method of using an SDR-enabled wireless computing device is provided. The device has system parameters. The method includes initiating a request to allow simultaneous communication of multiple radios and considering system requirements for the simultaneous communication. The method also includes comparing the system requirements for the simultaneous communication to the system parameters and conditionally enabling simultaneous communication of multiple radios when the system parameters are not within the system requirements.

In still another embodiment, a computer system is provided. The computer system includes programmable circuitry and software encoded on at least one computer-readable medium to program the programmable circuitry to implement a software defined radio. A verification module is employed to determine whether the software defined radio is able to communicate according to specified first and second wireless protocols simultaneously.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present invention relates to methods and apparatus for simultaneous multiple radio transmission/reception using Software Defined Radio (SDR) in a wireless device, e.g., a PC or handheld devices. Aspects of this invention relate to multi-radio (that is, simultaneous communication, e.g., transmission/reception of multiple transmissions/receptions) SDR capability check. Aspects of the invention are also directed to a process for checking the capability in system software and the hardware to run a single software defined radio. The details of determining compatibility for a single radio transmission/reception are described in co-pending U.S. patent application Ser. No. 11/635,869, filed, Dec. 8, 2006, titled, "System Capability Discovery for Software Defined Radio", which is assigned to the assignee of the present application and which is hereby incorporated herein by reference in its entirety. In the '869 application, a scheme was established so that the device's Operating System (OS) can determine its capability for a given protocol using a front-end device. However, the support of processing multiple radio signals simultaneously requires further modification.

One illustrative embodiment of the invention will now be described. In this illustrative example, suppose a user desires to use WiFi and cellular together on her wireless device (e.g., laptop). The user obtains software either stored in some portable memory device or by downloading the files and in one embodiment, the Operating System (OS) enables the SDR by downloading an executable file off the Internet (e.g., WindowsLive™, Amazon.com™, etc.). In this example, the desires cellular connection for certain tasks and at the same time, wants to be able to be connected to the Internet to do some other tasks via WiFi, for example. The user may go to WindowsLive™ and click on, e.g., "connections" and "download WiFi". Upon this request, according to an aspect of the invention, a capability check is performed on the computer and a header description of what is needed with an executable file is provided. The header may include information regarding the hardware needed to support WiFi, maximum frequency range, power, etc. In this case, the OS will check the hardware that is available by, for example, employing a table look-up table including information about when the hardware was installed and the hardware parameters to at least begin the determination whether the hardware can support the communication protocol desired. Other information about the hardware may be considered, as the present invention is not limited in this respect.

For cellular access, the user may access the same or a similar website to download the cellular access software, which may include any particular type of cellular protocol, such a wideband CDMA or WCDMA. The service provider may already know from a previous download that the user downloaded WiFi. A header will be downloaded for the capability check of a wideband CDMA so that the OS can check for capability for that access. If the two kinds of networks are to be used simultaneously, additional information may also be provided, via a header or a table look-up for example, regarding the requirements of the user's system front-end should entail and what the front-end should do. For example, if the user wants to use WiFi alone, the system would be compatible. If the user desires to use wideband CDMA, the system would be compatible. But, if the user wants to use both simultaneously, a wider tune (for example, RF) front-end may be necessary. In this regard, WiFi is in 2.4 GHz, whereas a wideband CDMA could be 1.7 GHz. In this example, the OS will determine whether the total bandwidth of both is supported.

Another example of a compatibility issue relates to the total power. The system may be able to support cellular alone, or WiFi alone but if both are used simultaneously, then the transmit power for each may be compromised. The OS therefore checks for suitable power requirements.

The user's wireless device will have the information whether or not it is still using WiFi. If the device is still using simultaneous radio, it will do the capability check as to whether the RF front-end matches the information provided from the website.

In some situations, the user may access a different website or a different memory device to download another technology (e.g., because that provider might have a better module for using wideband CDMA software, for example, than the prior provider). In this case, when the user accesses this module, the user's computer has no knowledge of what was previously done and thus just provides a single capability check. In one embodiment, the OS in this case may store in memory the access of the prior information and then check whether simultaneous radios using these two protocols is possible. The capability check might be more complex in this scenario because the user's computer might not have information from either of these sources on the front end and hardware requirements to enable these technologies. In one embodiment, one solution is that either the user's computer sends back a signal so when the user is downloading, the computer alerts the provider that it has SDR for a different wireless, say WiFi and that it is requesting technology to enable the new wireless, e.g., CDMA. In this case, a request is made to not only download the single software, a request is also made to provide information about what is necessary to do the multiple radios. In another embodiment, if the information is not available, the OS may download the wideband CDMA so now it has WiFi and wideband CDMA. A compatibility check is performed on the hardware by transmitting test signals simultaneously to determine whether the communication can occur, e.g., by probing the channel.

Thus, the user's OS performs a compatibility check to determine whether or not there is sufficient hardware and/or software or other features/requirements in order to allow it to simultaneously transmit multiple radios. Such features/requirements might include, but is not limited to, frequency, power or bandwidth, etc., as the present invention is not limited in this respect.

If the OS determines that it is not capable of certain individual or multiple radios, there are several options that can occur, as will now be described. In one example, suppose the OS is SDR capable for WiFi, but not CDMA or it is SDR capable for CDMA, but not WiFi, or it is not capable for either. In one aspect, a flag will alert the user of the non-compatibility. Alternatively, the flag will alert the user that simultaneous radio is available under certain situations. For example, the SDR might have limited performance for one of the technologies (WiFi or CDMA). In this regard, suppose the user downloads WiFi and then downloads wideband CDMA, and wideband CDMA is able to support 2 megabits per second when the user is stationary or moving very slowly, but only 384 kilobits per second when the user is moving relatively fast. So, the flag to the user might indicate that simultaneous radio is available but only at a certain bit speed. Other conditions may be imposed and alerted to the user, as the present invention is not limited in this respect.

Although the above discussion relates in some instances to hardware capability, the OS may also perform a compatibility check on the software. For example, suppose the user desires to download a future version of WiFi, the OS should perform a software check (possibly in addition to the hardware check) to determine whether the software can support the new version.

In another illustrative example, suppose the user desires to use WIMAX and WiFi simultaneously. The user may desire this because WIMAX is similar to cellular and the user wants to use wide area mobility and WiFi and wants to use them when employing local area networking. Both protocols employ Orthogonal Frequency-Division Multiplexing (OFDM). If the user uses the two protocols individually, there may be no compatibility issues. However, if the user wishes to use the two protocols simultaneously, in one embodiment, the OS splits the WiFi bitstream into two parallel streams and also splits the WIMAX bitstream. In this case, the sum of both streams is not available. In this regard, 52 parallel streams are present for WiFi and each stream is at about 300 KHz and 1024 parallel streams are present for WIMAX and each stream is at a much narrower bandwidth, at about 30+ KHz. The software controller will match to the lowest bandwidth of OFDM. In this regard, because the WIMAX has a narrower bandwidth than that of WiFi, the WiFi will need to have its sub-channels redivided into the similar bandwidth as the WIMAX, thereby increasing the number of parallel streams of WiFi by a factor of 10. Without being limited, a reason this may be necessary is because of the use of one Fast Fourier Transform (FFT) and one Inverse Fast Fourier Transform (IFFT) so that the simultaneous transmission can be performed in a less complex manner. In this regard, aspects of the invention seek to leverage again the same software and the same hardware to do the FFT/IFFT simultaneously.

Figure 1:
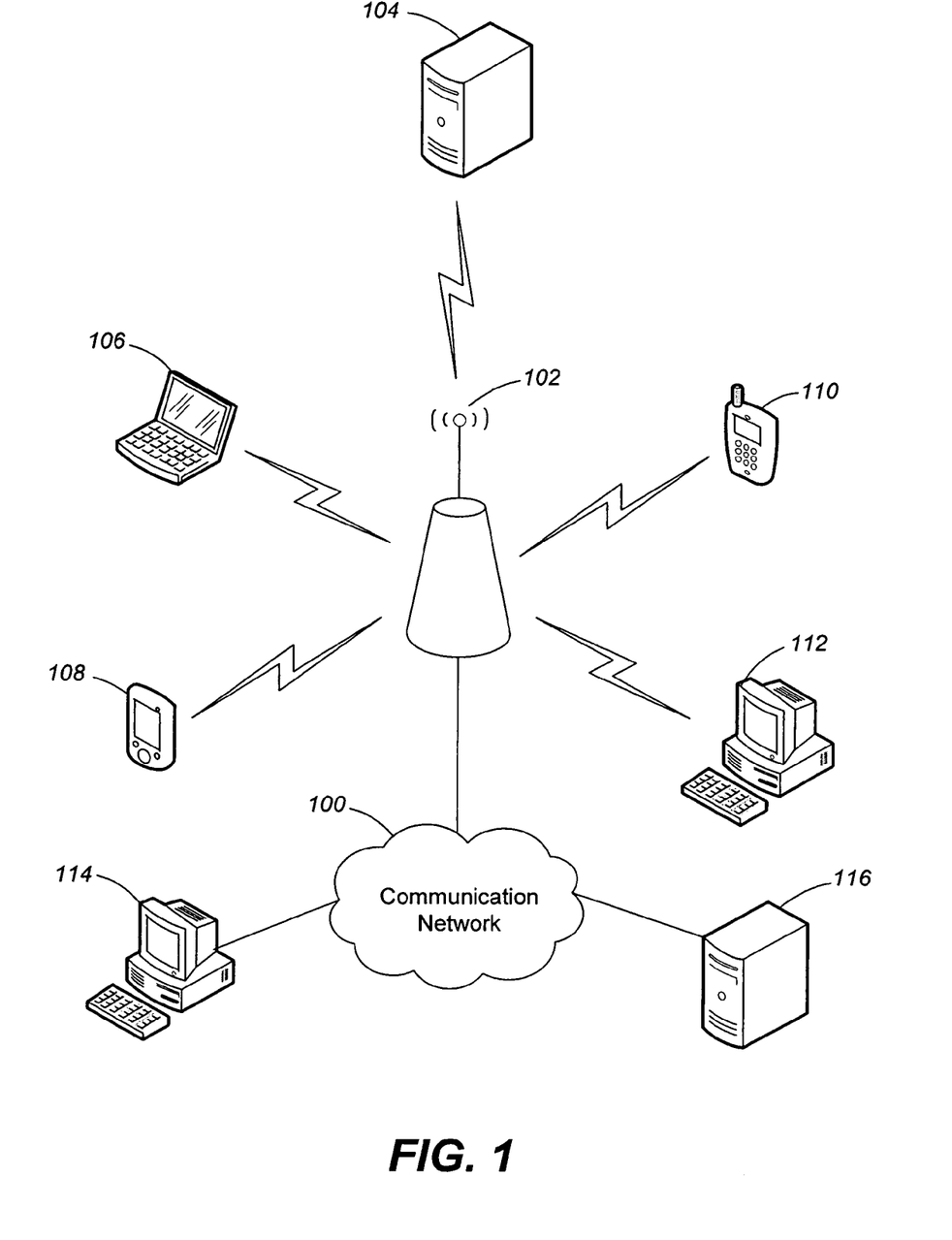
FIG. 1 is a diagram of an illustrative computer system environment in which embodiments of the invention may be implemented.

The aspects of the present invention described herein can be implemented on any of numerous computer system configurations and are not limited to any particular type of configuration. FIG. 1 illustrates one example of a computer system on which aspects of the invention can be implemented, although others are possible.

The computer system of FIG. 1 includes communication network 100, wireless access point 102, wireless computing devices 104-112, and wired computing devices 114 and 116. Communication network 100 can be any suitable communication medium or media for exchanging data between two or more computers (e.g., a server and a client), including the Internet. The wireless client devices can be any suitable computing device with wireless communication capabilities. Several exemplary mobile computing devices are shown, including laptop 106, personal digital assistant 108, and smart phone 110. In addition, typically stationary devices can be enabled for wireless communication, such as server 104 and computer terminal 112. Each of these mobile and stationary devices is in a state of, or capable of being in a state of, wireless communication with wireless access point 102 connected to communication network 100. This wireless communication allows the computing devices to exchange data with one another or, through communication network 100, with wired devices 114 and 116.

As mentioned above, the embodiments of the invention described herein are not limited to being practiced with the exemplary system shown in FIG. 1, and can be employed on systems employing any number of wireless access points and/or computing devices. In addition, while FIG. 1 shows the computing devices in wireless communication with wireless access point 102, it should be appreciated that embodiments of the invention may operate in networks wherein the computing devices communicate with one another directly and not through an access point. Also, while FIG. 1 includes communication network 100 with wired devices 114 and 116, embodiments of the invention can be used in systems that do not include a wired network.

Figure 2:
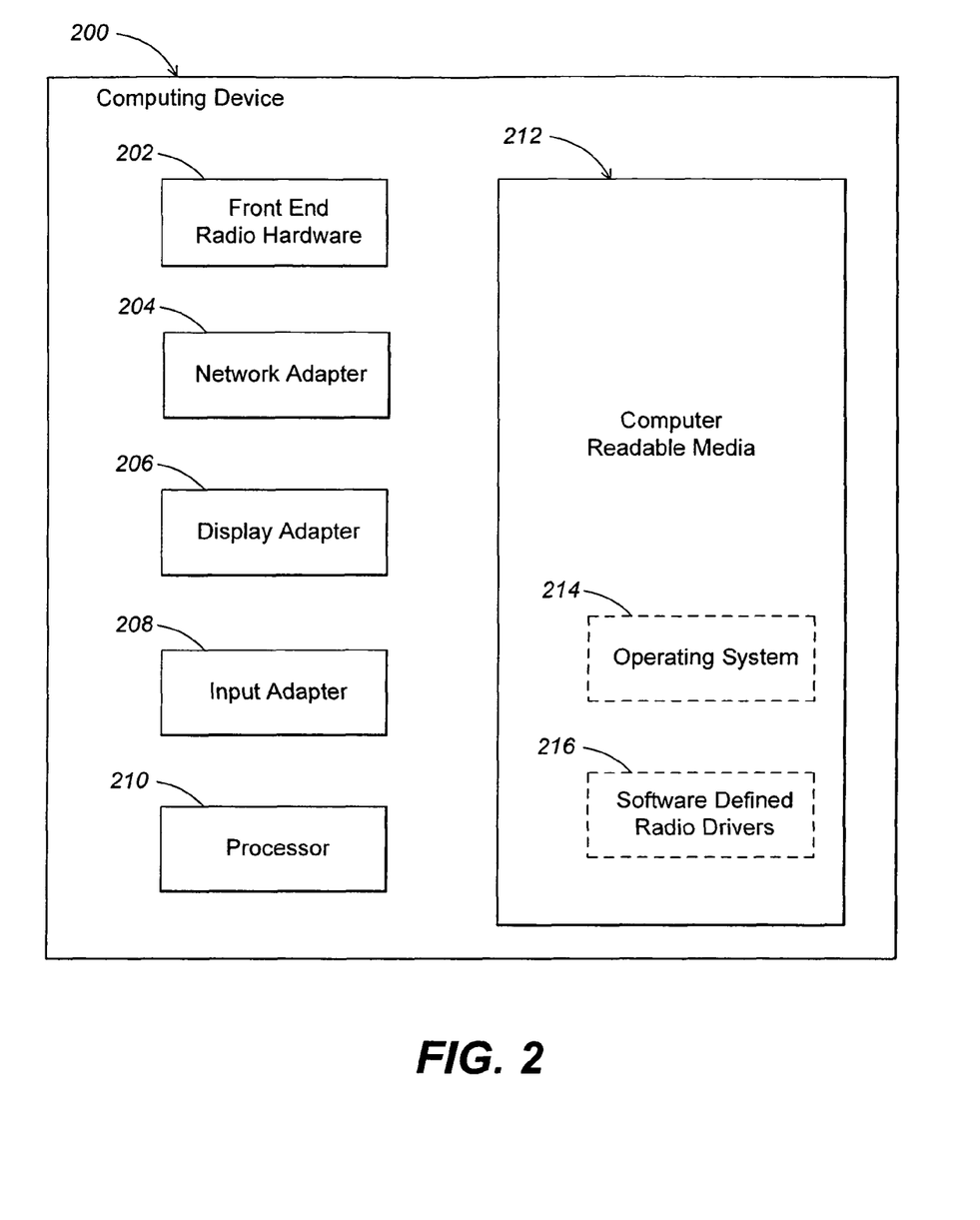
FIG. 2 is an exemplary computing device that may be used in accordance with embodiments of the invention.

FIG. 2 schematically shows an illustrative computing device 200 that may be used in accordance with one or more embodiments of the invention. FIG. 2 is intended to be neither a depiction of necessary components for a computing device to operate with embodiments of the invention nor a comprehensive depiction. Computing device 200 comprises front end radio hardware 202 to communicate wirelessly, e.g., with wireless access point 102 or with other devices. Device 200 also comprises a network adapter 204 to communicate over a computer network using other (possibly non-wireless) methods, a display adapter 206 to display information to a user of the device, and an input adapter 208 to receive commands from the user. Device 200 further comprises computer-readable media 212 for storing data to be processed and/or instructions to be executed by a processor 210. Processor 210 enables processing of data and execution of instructions. The data and the instructions may be stored on the computer-readable media 212 and may, for example, enable communication between components of the computing device 200.

The data and instructions may comprise an operating system 214 and software defined radio drivers 216. SDR drivers 216 may comprise data and instructions to carry out many functions typically done in hardware-implemented radios. The functions performed by drivers 216 may complement the functions of front end radio hardware 202, such that all desired functions may be performed by the combination of hardware and software.

Front-end radio hardware 202 may be any suitable radio hardware performing any combination of functions. These functions may include modulation (i.e., mixing a data signal into a high frequency transmission signal), filtering (i.e., parsing data out of a received signal), analog-to-digital or digital-to-analog conversion, signal generation (i.e., transmitting the data), etc. Front-end 202 may be implemented to perform a minimum of the required functions that need to be performed at the hardware level, with the remaining functions being implemented by SDR drivers 216. The present function is not limited to use with systems that decide the responsibilities of the hardware and software in any particular way. Front-end 202 may comprise an antenna, a programmable radio-frequency waveform generator/decoder that spans a wide radio spectrum, an array of fast analog to digital converters, and/or serializers/de-serializers to convert analog data into computer-processable bytes and vice versa. A set of tunable analog filters may also be employed to comply with mandated spectrum masks. These hardware components are merely illustrative, as invention not limited to use on systems having any particular hardware.

SDR drivers 216, in addition to performing radio functions, may transmit control instructions to the tunable circuitry of front-end 202 to customize the hardware of the front-end 202 according to a particular wireless protocol. As one example, a user may have selected to enable communication having a bandwidth of 83 MHz according to the Institute of Electrical and Electronics Engineers' (IEEE) 802.11b standard. As a further example, the front-end 202 may have a configurable bandwidth with a range of 200 KHz to 500 MHz. In this case, the SDR drivers 216 may send a control signal (in any suitable manner) to the waveform generator of front-end 202 to generate signals having, among other characteristics, a total bandwidth one-sixth of the front end's capacity (namely, the 83 MHz established by the IEEE 802.11b standard). It should be appreciated that embodiments of the invention are not limited to use with SDRs that have a configurable bandwidth with the above-desired range, nor to SDRs that configure hardware according to any specific technique, as the embodiments of the invention can be used with SDRs that tune the hardware components in any suitable manner.

It should be appreciated that one embodiment of the invention is directed to use with a computing device having programmable circuitry (e.g., the front end hardware 202 and the SDR drivers 216) that is programmable by control instructions to generate and/or receive signals according to a wireless protocol. Again, this programmable circuitry can take any suitable form and include any collection of directly programmable circuitry (e.g., a programmable processor) and circuitry that interacts with directly programmable circuitry to enable communication according to a wireless protocol.

It should be appreciated that the embodiments of the present invention described herein are not limited to being practiced with the type of computing device illustrated in FIG. 2, and that embodiments of the invention can be practiced with any suitable computing device. The front-end 202 and adapters 204-208 may be implemented as any suitable hardware, software, or combination thereof, and may be implemented as a single unit or multiple units. Similarly, computer-readable media 212 may be implemented as any medium or combination of media for storing data and instructions for access by a processing device.

As discussed above, in one embodiment of the invention, capability checking is provided for determining the capabilities of the computing device 200 (e.g., front-end 202 and operating system 214, including SDR drivers 216) and the compatibility of the computing device with multiple wireless protocols simultaneously. It should be appreciated that this determination can be done in any suitable manner. Exemplary discovery techniques are disclosed herein, but embodiments of the invention are not limited to any particular implementation technique.

As discussed above, a wireless device, such as a laptop, includes front-end hardware components, such as RF components, ADC and DAC. The wireless device may include these hardware components as a miniPCI, PCIe, PCMCIA or on the mother board. In one embodiment, the front end is characterized by the parameter set: maximum frequency, minimum frequency, maximum RF power, DC bias, frequency response characteristics, tunable bandwidth, and power amplifier non-linearity characterized by the compression ratio.

In one illustrative embodiment, the user may need to have the capability on the laptop for simultaneously using 802.11n (e.g., WiFi), Zigbee, and Bluetooth. For example, the user might use 802.11n for home networking, Zigbee for sensory control in the home (e.g., home automation), and Bluetooth for the headset when using VoIP over MSN messenger, for example.

Accordingly, aspects of the invention include a system compatibility module, a data transmission module and a data reception module. Embodiments of system compatibility check will now be described with reference to FIGS. 3a and 3b.

Figure 3A:
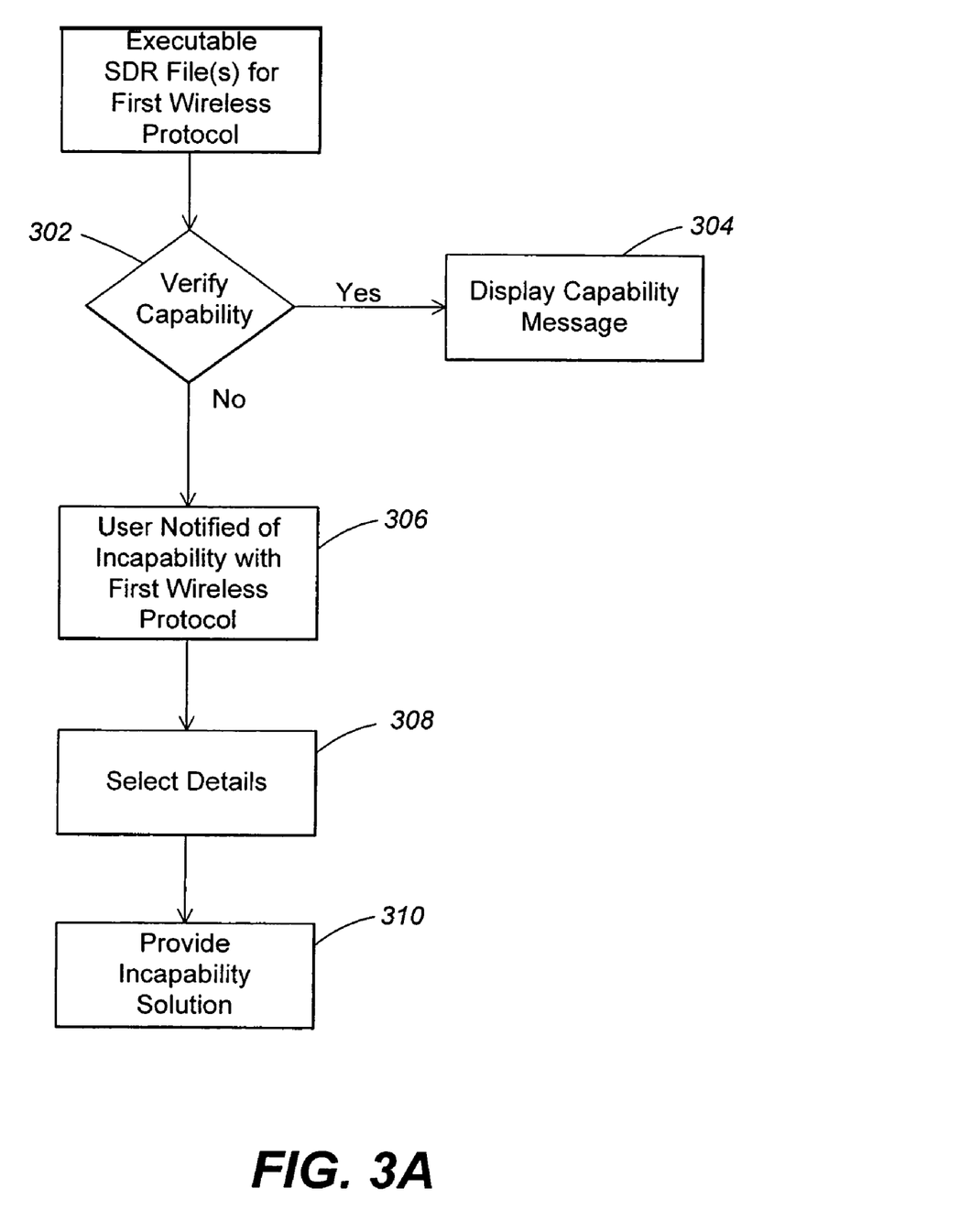
FIG. 3a is a flowchart of an illustrative process of determining whether a first wireless protocol is supported by a computing device's software and hardware.

In FIG. 3a, at block 300, the user starts by downloading an executable SDR file(s) for IEEE 802.11n. Downloading can be either from Windows Live, Yahoo, Ericsson, or other signed third party ISV via cable, DSL, wireless last mile connection, a DVD, out-of-box (software vendor Windows signed product), USB flash, or other sources, as the present invention is not limited in this respect. For corporate users, an intranet option is also possible. At block 302, an event triggers the OS to verify the capability of the software plus the capability of the hardware as described in the above-mentioned co-pending patent application Ser. No. 11/635,869. If the capability is confirmed, a message is flagged at block 304 confirming the capability of the front end and SW. If the capability check returns an error, at block 306, the user is notified that 802.11n is not supported by the SDR implementation. At block 308, a choice for providing more details is given. When the user chooses more details, the SDR diagnostic framework returns where the SDR capability fails and possibly how the user can solve the problem.

Figure 3B:
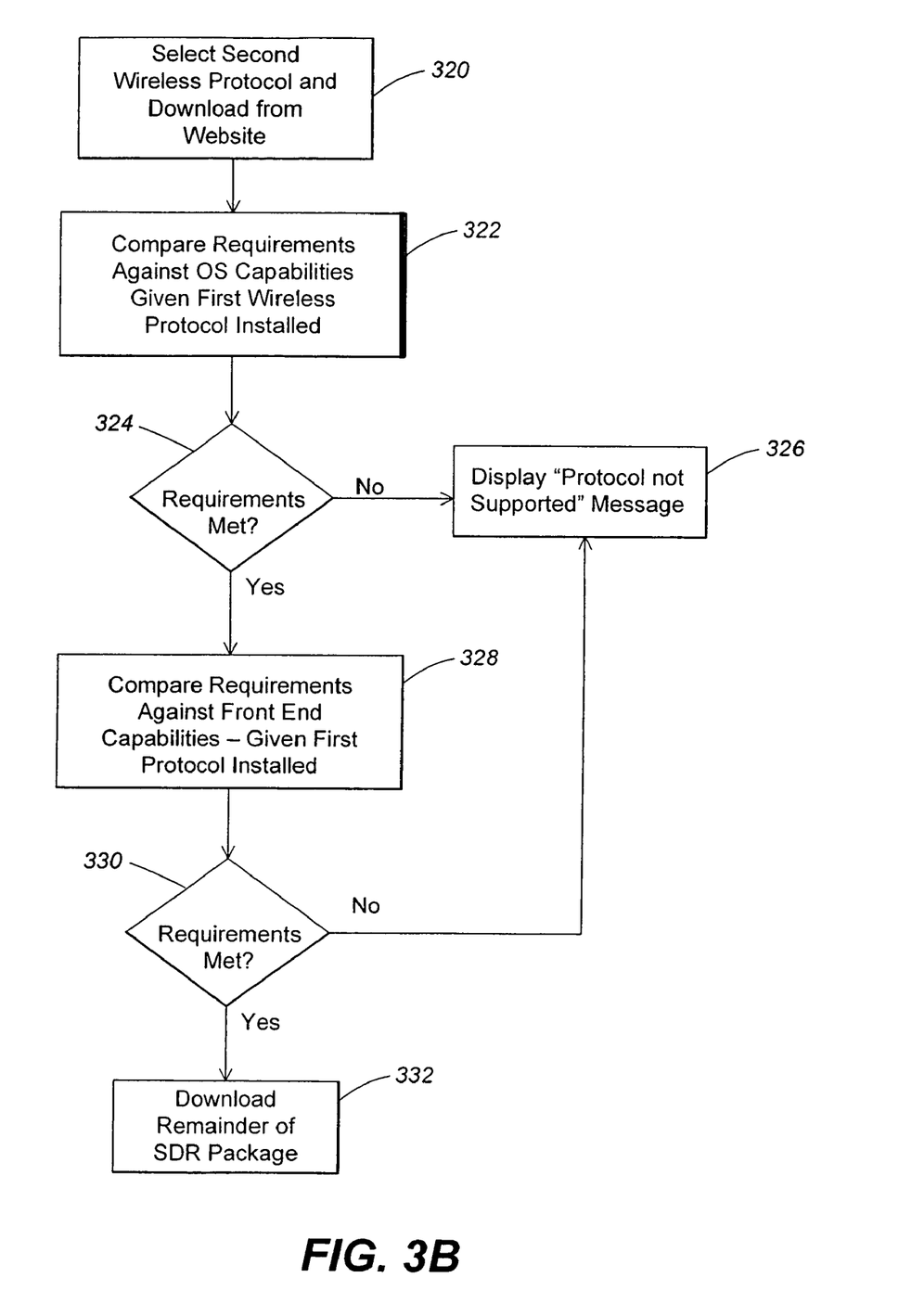
FIG. 3b is a flowchart of an illustrative process of determining whether a second wireless protocol is supported by a computing device's software and hardware.
Figure 4:
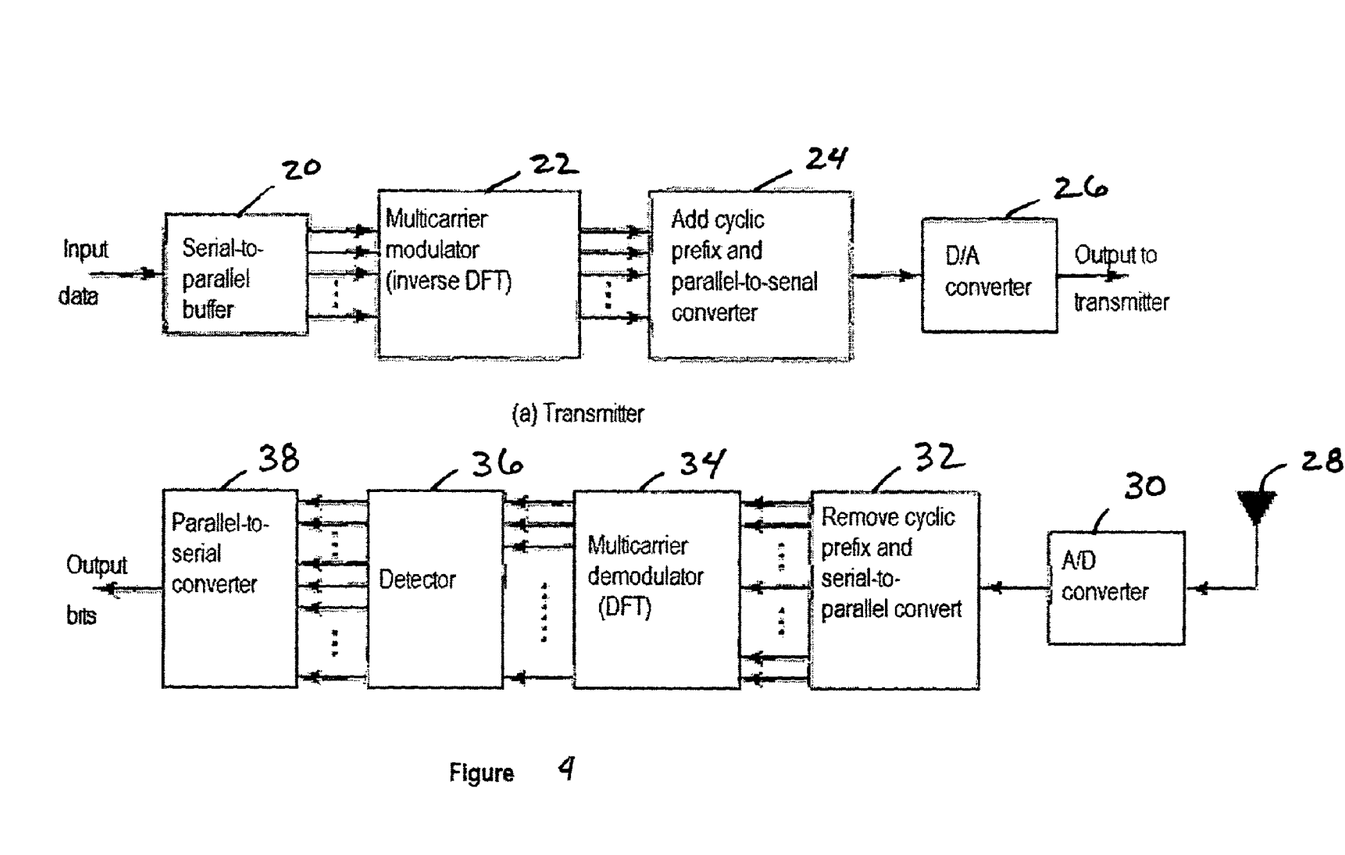
FIG. 4 is a block diagram of signal processing according to one embodiment.

Turning to FIG. 3b, at block 320, the user now downloads the second wireless protocol, e.g., Zigbee. This download can be from the same source as the download of the first protocol (e.g., IEEE 802.11n). In this case, in one embodiment, the OS performs two checks: 1) SDR capability for the second protocol (e.g., Zigbee) in a similar way described above and in the above-mentioned co-pending patent application Ser. No. 11/635,869; and 2) SDR capability for simultaneous radio operation for transmission and reception. In one embodiment, a same source download will also have available a matrix of what is required for simultaneous radio operations. If the source is not trusted or if the second protocol is from a different source, in one embodiment, the OS will perform a capability check.

At blocks 322 and 324, the OS compares the requirements for the second protocol against the capabilities of the OS given the first protocol installed. If the requirements are not met, at block 326, the OS returns a flag indicating that the second protocol is not supported. If the requirements are met, at block 328 and 330, the OS compass the requirements for the second protocol against the capabilities of the front-end, given the first protocol installed. If the requirements are not met, at block 326, a flag is returned to the user indicating that the second protocol is not supported. If, at block 330, the requirements are met, then at block 332, the remainder of the SDR package is downloaded.

This process may be repeated if a third and subsequent wireless protocols, such as Bluetooth, is desired.

In one embodiment, the user can choose all desired wireless protocols simultaneously from the same source. The source may be equipped with the correct header capability for these multiple protocols.

For example, in one embodiment, the following offered capability is returned upon discovery of the front-end device:

| | |
|---|---|
| Total Bandwidth | 500 MHz |
| Lower Frequency | 1.8 GHz |
| Upper Frequency | 5.9 GHz |
| A/D rate | 1 Gsps |
| Bit per sample | 3 |
| EIRP | 43 dBm |

The capability required when choosing the first protocol (e.g., Wi-Fi) is:

| | |
|---|---|
| Total Bandwidth | ≦40 MHz |
| Lower Frequency | 2.4 GHz |
| Upper Frequency | 2.483 GHz |
| A/D rate | 150 Msps |
| Bit per sample | 2 |
| EIRP | 23 dBm |

Because the parameters of the first protocol are within the front-end operating parameters, the front-end is capable of transmitting and receiving using the first protocol.

When selecting the second SDR protocol (e.g., Zigbee), the capability required is:

| | |
|---|---|
| Total Bandwidth | 1 MHz |
| Lower Frequency | 2.4 GHz |
| Upper Frequency | 2.483 GHz |
| A/D rate | 500 ksps |
| Bit per sample | 3 |
| EIRP | 23 dBm |

Here again because the parameters of the second protocol are within the front-end operating parameters, the front-end is capable for this second protocol (e.g., Zigbee).

However, according to aspects of the invention, a third check may be required to determine whether both protocols can communicate simultaneously (i.e., can be simultaneously transmitted and/or received). Here, the combined capability required is:

| Total Bandwidth | ≦41 MHz (total used by both protocols) |
|---|---|
| Lower Frequency | 2.4 GHz |
| Upper Frequency | 2.483 GHz |
| A/D rate | 3 ksps |
| Bit per sample | 3 |
| EIRP | 26 dBm |

Because the parameters of the combined protocols are within the system parameters, the SDR is capable of simultaneous communication (transmission and/or reception) of both protocols.

It should be appreciated that chipset vendors may be encouraged to include as an update a multidimensional matrix. For instance, dual radios may include the following:

|  | 802.11n | 802.11g | 802.11a | Zigbee | UWB | Bluetooth | WCDMA |
|---|---|---|---|---|---|---|---|
| 802.11n |  | ✓ | ✓ | ✓ | X | ✓ | X |
| 802.11g | ✓ |  | ✓ | ✓ | X | ✓ | X |
| 802.11a | ✓ | ✓ |  | ✓ | X | ✓ | X |
| Zigbee | ✓ | ✓ | ✓ |  | X | ✓ | X |
| UWB | X | X | X | X |  | ✓ | X |
| Bluetooth | ✓ | ✓ | ✓ | ✓ | ✓ |  | ✓ |
| WCDMA | X | X | X | X | X | ✓ |  |

This shows that the wireless device is SDR capable of simultaneous communication (i.e., transmission and/or reception) of certain first protocols with certain second protocols. For example, the 802.11n protocol includes a check mark "✓" in the column for the Zigbee and Bluetooth protocols (as well as others), indicating that the wireless device is capable of simultaneous communication of 802.11n with Zigbee and Bluetooth, for example. The "X" indicates that the wireless device is not capable of simultaneous communication for the two protocols. For example, the wireless device is not capable of simultaneous communication using 802.11n and WCDMA protocols.

Embodiments of simultaneous SDR transmission of multiple radios will now be described.

In OFDM the available channel bandwidth W is subdivided into a number of equal-bandwidth called sub-channels, where the bandwidth of each sub-channel is sufficiently narrow so that the frequency response characteristics of the sub-channels are nearly ideal. Such a subdivision of the overall bandwidth into smaller sub-channels can be represented by K=W/Δf sub-channels.

In simultaneous multi-radio transmission, different sub-channels not only carry different information symbols from one wireless technology, but it carries information from multiple wireless technologies that use OFDM transmission. Different information symbols from the same wireless technology can be transmitted in the K1 sub-channels. The second wireless technology is transmitted in the next K2 sub-channels. A third wireless technology is transmitted in the next K3 sub-channels, and so on, such that:

K1+K2+ ... +Knw=K where nw is the number of simultaneous wireless protocols. With each sub-channel, a carrier is associated as follows:

$x_k(t) = \sin 2\pi f_k t$, $k=0,1,\ldots,K-1$ where $f_k$ is the mid-frequency in the kth sub-channel. By selecting the symbol rate 1/T on each of the sub-channels to be equal to the separation Δf of adjacent subcarriers, the subcarriers are orthogonal over the symbol interval T, independent of the relative phase relationship between sub carriers; i.e., $$\int_0^T \sin(2\pi f_k t + \phi_k)\sin(2\pi f_j t + \phi_j)dt = 0$$

where $f_k - f_j = n/T$, n=1, 2, ..., independent of the values of the phases $\Phi_k$ and $\Phi_j$.

With an OFDM system having K sub-channels, the symbol rate on each sub carrier is reduced by a factor of N relative to the symbol rate on a single carrier system that employs the entire bandwidth W and transmits data at the same rate as OFDM. Hence, the symbol interval in the OFDM system is T=KT$_s$, where T$_s$ is the symbol interval in the single-carrier system.

The modulator and demodulator in an OFDM system are efficiently implemented by use of the FFT algorithm to compute the DFT/IDFT. The basic block diagram of the OFDM is illustrated in FIG. 2. At block 20, a serial-to-parallel buffer subdivides the information sequence into frames of B$_f$ bits. The B$_f$ bits in each frame are parsed into K groups, where the i th group is assigned b$_i$ bits.

Hence, $$\sum_{i=1}^{K} b_i = B_f$$

A multi-carrier modulator, as illustrated at block 22, may be viewed as generating K independent QAM sub-channels, where the symbol rate for each sub-channel is 1/T and the signal in each sub-channel has a distinct QAM constellation. Hence, the number of signal points for the i⁻th sub-channel is $M_i = 2^{b_i}$. At block 24 a cyclic prefix is added to reduce the effect of intersymbol interference from neighboring symbols. Then the parallel sequence is multiplexed back into a serial stream of bits, and inputted to a digital to analog converter (D/A) at block 26 that renders the digital symbols into analogue before up converting to the RF frequency of interest and radiating with an antenna.

The receive side is the reciprocal of transmission. The receive RF signal is intercepted by an antenna shown at 28, down converted in frequency before it is digitized by an analogue to digital converter (A/D) at block 30, multiplex from a serial stream to a parallel stream. At block 32 the prefix added in transmission is removed. An FFT is preformed, at block 34, on the parallel sequence. This followed by a detector at block 36, to decide on the bits, which is then input to a parallel to serial multiplexer, at block 38.

The complex-valued signal points corresponding the information signals on the K sub-channels may be denoted by $X_k$, k=0, 1, ..., K−1. These information symbols {$X_k$} represent the values of the discrete Fourier transform (DFT) of a multi-carrier OFDM signal x(t), where the modulation on each subcarrier is QAM. Since x(t) must be a real-valued signal, its N-point DFT {$X_k$} must satisfy the symmetry property $X_{N-k} = X^*_k$. Therefore, we create N=2K symbols from K information symbols by defining:

$X_{N-K} = X^*_K$, k=1,2,...,K−1

$X'_0 = Re(X_0)$ $X_N = Im(X_o)$

Note that the information symbol $X_0$ is split into two parts, both of which are real. If the new sequence of symbols is denoted as $\{X'_k, k=0,1, \ldots, N-1\}$, the N-point inverse DFT (IDFT) yields the real-valued sequence:

$$x_n = \frac{1}{\sqrt{N}} \sum_{k=0}^{N-1} X'_k \exp(j2\pi nk/N) \; n = 0, 1, \ldots, N-1$$

where $1/\sqrt{N}$ is simply a scale factor.

This sequence $\{x_n, 0 \leq n \leq N-1\}$ corresponds to samples of the multicarrier OFDM signal x(t), consisting of K subcarriers.

Embodiments of simultaneous SDR reception will now be described.

In one embodiment, two modes for receiving SDR signals are provided: isolated mode, and wideband mode.

In the isolated mode, the wireless device determines the state of radios received. The OS will be capable of receiving from a set of radios, but only chooses to receive from a first wireless protocol (e.g., 802.11n) and a second wireless protocol (e.g., Zigbee). In this illustrative embodiment, the front-end and the OS perform the following operations: the front-end receives signals from across the wide spectrum and digital filtering is applied to pass the intended radios. Two FFTs are performed in isolation. The number of FFTs is equal to the number of simultaneous radios, in this example, two—one for the first wireless protocol (e.g., 802.11n) and the other for the second wireless protocol (e.g., Zigbee). Baseband processing and MAC processing is then performed by SDR modules corresponding to those protocols.

In the wideband mode, the wireless device determines does not have a priori the state of radios received. The OS will be capable of receiving from all sets of SDR radios that the OS and front-end capabilities were confirmed. In this example, the front-end and the OS performs the following operations: the front-end receives signals from across the wide spectrum and one wideband FFTs is performed across the spectrum. The output of the FFT is then multiplexed according to the number of SDR radios of interest. Baseband processing and MAC processing is then performed by SDR modules corresponding to those protocols.

In both modes, a cognitive technique may be used to enhance determination of overlapping radios (such as in Bluetooth and 802.11b/g) and the OS can then perform spectrum sharing etiquettes, or in one embodiment, a third party software can be used for joint demodulation of signals.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of using a Software Defined Radio (SDR)-enabled wireless device, the SDR-enabled wireless device comprising hardware and/or software for wireless communication and having system parameters indicating capabilities of the hardware and/or software, the method comprising:
  a) receiving a request for performing simultaneous communication according to a first wireless protocol and a second wireless protocol, the first wireless protocol having first protocol requirements for communication and the second wireless protocol having second protocol requirements for communication;
  b) determining whether the hardware and/or software of the SDR-enabled wireless device supports simultaneous communication according to the first wireless protocol and the second wireless protocol based at least in part on comparing requirements for the simultaneous communication to the system parameters that indicate the capabilities of the hardware and/or software for wireless communication; and
  c) when the hardware and/or software supports simultaneous communication according to the first wireless protocol and second wireless protocol, enabling simultaneous communication according to the first and second wireless protocols.

2. The method of claim 1, wherein receiving said request for performing simultaneous communication according to the first and second wireless protocols comprises receiving a request of a first provider for performing communication of the first wireless protocol and thereafter storing information regarding whether the device is in communication via the first wireless protocol.

3. The method of claim 2, wherein receiving said request for performing simultaneous communication according to the first and second wireless protocols comprises receiving a request of a second provider for performing communication of the second wireless protocol and receiving information about the requirements for simultaneous communication according to the first and second protocols.

4. The method of claim 2, wherein receiving said request for performing simultaneous communication according to the first and second wireless protocols comprises receiving a request of a second provider for performing communication of the second wireless protocol and thereafter transmitting test signals simultaneously using the first and second protocols to determine whether simultaneous communication is supported.

5. The method of claim 1, wherein comparing the requirements for the simultaneous communication to the system parameters comprises comparing system requirements to system parameters on communication software installed on the SDR-enabled wireless device.

6. The method of claim 1, wherein comparing the requirements for the simultaneous communication to the system parameters comprises comparing system requirements to system parameters on communication hardware installed on the SDR-enabled wireless device.

7. The method of claim 1, further comprising splitting a bitstream of the first wireless protocol into first parallel bitstreams each of a first bandwidth and splitting a bitstream of the second wireless protocol into second parallel bitstreams each of a second bandwidth.

8. The method of claim 7, wherein enabling simultaneous communication of the first and second wireless protocols comprises enabling simultaneous communication by matching to a smaller bandwidth of the first and second bandwidths.

9. The method of claim 8, wherein matching to said smaller bandwidth of the first and second bandwidths comprises dividing sub-channels of one of the first and second bandwidths into a bandwidth of a larger bandwidth of the first and second bandwidths.

10. The method of claim 1, wherein, in determining whether the hardware and/or software supports the simultaneous communication, the comparing comprises comparing the system parameters to a combination of the first protocol requirements and the second protocol requirements.

11. A method of using a Software Defined Radio (SDR)-enabled wireless computing device, the SDR-enabled wireless device comprising hardware and/or software for wireless communication and having system parameters indicating capabilities of the hardware and/or software, the method comprising:
  a) receiving a request for performing simultaneous communication according to a first wireless protocol and a second wireless protocol, the first wireless protocol having first protocol requirements for communication and the second wireless protocol having second protocol requirements for communication;
  b) merging the first protocol requirements and the second protocol requirements to yield requirements for the simultaneous communication;
  c) determining whether the hardware and/or software of the SDR-enabled wireless device supports simultaneous communication according to the first wireless protocol and the second wireless protocol based at least in part on comparing the system requirements for the simultaneous communication to the system parameters that indicate the capabilities of the software and/or hardware installed on the SDR-enabled wireless device; and d) conditionally enabling simultaneous communication according to the first and second wireless protocols based at least in part on a result of the determining of act b).

12. The method of claim 11, wherein receiving said request for performing simultaneous communication of the first and second wireless protocols comprises receiving a request of a first provider for performing communication of a first wireless protocol and thereafter storing information regarding whether the device is in communication via the first wireless protocol.

13. The method of claim 12, wherein receiving said request for performing simultaneous communication of the first and second wireless protocols comprises receiving a request of a second provider for performing communication of a second wireless protocol.

14. The method of claim 12, wherein receiving said request for performing simultaneous communication of the first and second wireless protocols comprises receiving a request of a second provider for performing communication of a second wireless protocol and thereafter transmitting test signals simultaneously using the first and second protocols to determine whether the simultaneous communication can occur.

15. The method of claim 11, wherein comparing the requirements for the simultaneous communication to the system parameters comprises comparing the requirements to system parameters on communication software installed on the SDR-enabled wireless device.

16. The method of claim 11, wherein comparing the requirements for the simultaneous communication to the system parameters comprises comparing the requirements to system parameters on communication hardware installed on the SDR-enabled wireless device.

17. The method of claim 11, wherein merging the first protocol requirements and the second protocol requirements to yield requirements for the simultaneous communication comprises combining the first protocol requirements and the second protocol requirements.

\* \* \* \* \*

UNITED STATES PATENT AND TRADEMARK OFFICE
CERTIFICATE OF CORRECTION

| | | |
|---|---|---|
| PATENT NO. | : 8,054,779 B2 | |
| APPLICATION NO. | : 11/899276 | |
| DATED | : November 8, 2011 | |
| INVENTOR(S) | : Amer A. Hassan et al. | |

It is certified that error appears in the above-identified patent and that said Letters Patent is hereby corrected as shown below:

The title page showing the illustrative figure should be deleted to be replaced with the attached title page.

In the drawing sheet, consisting of Fig. 3A, should be deleted to be replaced with the drawing sheet, consisting of Fig. 3A, as shown on the attached pages.

In column 14, line 67, in Claim 11, after "comparing the" delete "system".

Signed and Sealed this
Seventh Day of August, 2012

David J. Kappos
*Director of the United States Patent and Trademark Office*

United States Patent
Hassan et al.

(10) Patent No.: US 8,054,779 B2
(45) Date of Patent: Nov. 8, 2011

(54) SIMULTANEOUS WIRELESS SUPPORT IN SOFTWARE DEFINED RADIO

(75) Inventors: Amer A. Hassan, Kirkland, WA (US); Deyun Wu, Issaquah, WA (US); Hui Shen, Sammamish, WA (US); Christian Huitema, Clyde Hill, WA (US); Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 11/899,276

(22) Filed: Sep. 5, 2007

(65) Prior Publication Data

US 2008/0279128 A1 Nov. 13, 2008

Related U.S. Application Data

(60) Provisional application No. 60/928,168, filed on May 8, 2007.

(51) Int. Cl.
*H04W 4/00* (2009.01)

(52) U.S. Cl. ........ 370/328; 370/203; 370/310; 370/338; 370/347; 375/219; 375/220; 375/261; 375/316; 455/140; 455/432.2; 455/440; 455/561

(58) Field of Classification Search ........... 370/203, 370/310, 328, 338, 347; 375/219, 220, 261, 375/271, 316; 455/140, 432.2, 440, 552.1, 455/561

See application file for complete search history.

(56) References Cited

U.S. PATENT DOCUMENTS

| | | | | |
|---|---|---|---|---|
| 5,504,803 A * | 4/1996 | Yamada et al. | ........... | 455/426.1 |
| 5,995,829 A * | 11/1999 | Broderick | ........... | 455/418 |
| 6,122,514 A * | 9/2000 | Spaur et al. | ........... | 455/448 |
| 6,219,539 B1 * | 4/2001 | Basu et al. | ........... | 455/417 |
| 6,272,315 B1 * | 8/2001 | Chang et al. | ........... | 455/13.1 |
| 6,353,846 B1 * | 3/2002 | Fleeson | ........... | 718/104 |
| 6,828,400 B1 * | 12/2004 | Newberth et al. | ........... | 526/321 |
| 6,915,142 B1 * | 7/2005 | Wietfeldt | ........... | 455/557 |
| 6,954,446 B2 * | 10/2005 | Kuffner | ........... | 370/335 |
| 6,968,195 B2 * | 11/2005 | Nowak | ........... | 455/456.2 |

(Continued)

FOREIGN PATENT DOCUMENTS

WO WO 2004/057505 A1 7/2004

OTHER PUBLICATIONS

Lin, V.S. et al. "Implementation of Reconfigurable Software Radio for Multiple Wireless Standards," *2004 IEEE Aerospace Conference Proceedings*, pp. 1392-1397.

(Continued)

*Primary Examiner* — Ayaz Sheikh
*Assistant Examiner* — Andrew C Lee
(74) *Attorney, Agent, or Firm* — Wolf, Greenfield & Sacks, P.C.

(57) ABSTRACT

A system and method for providing the ability to discover the capabilities of a user's computer to determine whether it is capable of supporting more than one wireless protocol simultaneously is provided. A computing device's capabilities (including, for example, hardware and/or software capabilities) is checked to determine if it supports at least two specific wireless protocols and checking a computing device's capabilities (including, for example, hardware and/or software capabilities) is checked to determine if it supports both wireless protocols simultaneously. The techniques for determining the computing device's compatibility may include comparing lists of protocol requirements to lists of system capabilities and/or generating test signals by the system according to the protocol.

17 Claims, 5 Drawing Sheets

*FIG. 3A*